L. O. CAPEL.
SPANNER.
APPLICATION FILED JAN. 21, 1915.
1,198,822.
Patented Sept. 19, 1916.
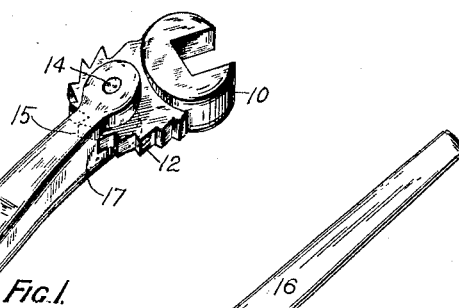
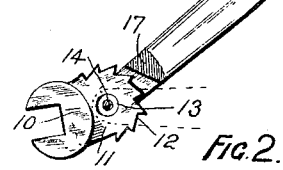
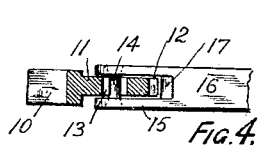
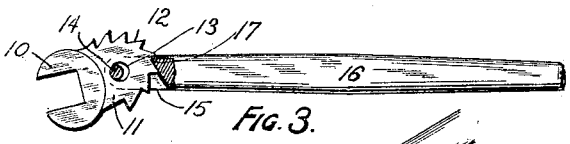
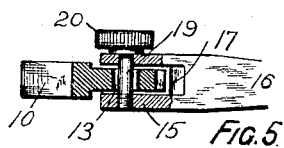
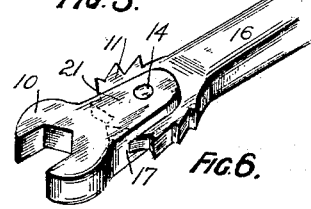
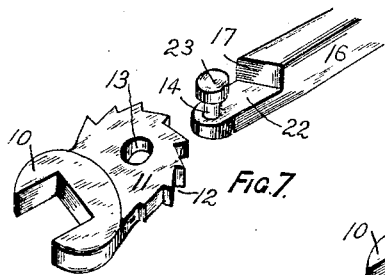
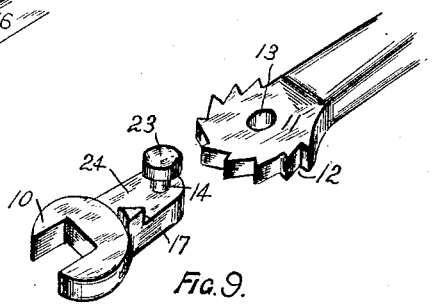
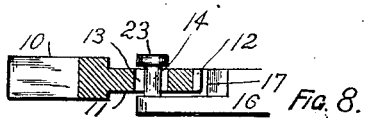
Inventor.
Lyle Oswald Capel.
By Chas H Riches
attorney.

UNITED STATES PATENT OFFICE.

LYLE OSWALD CAPEL, OF PIEDMONT, COBBADAH, NEW SOUTH WALES, AUSTRALIA.

SPANNER.

1,198,822.   Specification of Letters Patent.   Patented Sept. 19, 1916.

Application filed January 21, 1915. Serial No. 3,468.

*To all whom it may concern:*

Be it known that I, LYLE OSWALD CAPEL, station manager, a subject of the King of Great Britain and Ireland, residing at Piedmont, Cobbadah, in the State of New South Wales and Commonwealth of Australia, have invented new and useful Improvements in Spanners, of which the following is a specification.

This invention relates to improvements in spanners of the class especially adapted for use in places where the movement of the handle is limited and where an ordinary spanner would be useless, and the object of the invention is to provide a simple, cheap and effective spanner which will embody all the advantages of a ratchet without the use of spring pawls and the like.

The invention is carried out by constructing one of the companion members with a partial circular ratchet disk provided with an orifice in the center thereof, and the other member with a pin or lug of smaller diameter adaped to take into the said orifice and a fixed tooth adapted to engage the teeth of the ratchet disk. When the members are united together by inserting the pin or lug on one member into the orifice in the other the parts are loosely connected and can be moved in any direction by reason of the pin being of smaller diameter than the orifice, and for the same reason the fixed tooth on the one member can be made to engage any of the teeth on the other member, so that the handle can be operated at any desired angle. But in order that the invention may be more clearly understood reference will now be made to the drawings which accompany and form part of this complete specification and in which:—

Figure 1 is a perspective view of one form of construction of the spanner according to this invention. Figs. 2, 3 and 4 are sectional views thereof. Fig. 5 a sectional view of a modified form of construction which provides that various sized jaws may be used on same handle. Fig. 6 a perspective view of another form of construction. Fig. 7 a perspective view of a further form of construction. Fig. 8 a sectional view thereof. Fig. 9 a perspective view of a still further form of construction.

Referring to Figs. 1 to 4 the jaw 10 has integral therewith a partial circular disk 11 with ratchet teeth 12 and an orifice 13 positioned in the center of the circular disk 11 into which is adapted to take a pin 14 of a lesser diameter than the orifice 13. This pin 14 is affixed in the bifurcated jaw or shank 15 of the handle 16. Within the bifurcation 15 and integral therewith is a fixed tooth 17 adapted to engage with the teeth 12 of the ratchet disk 11. In use the handle 16 may be placed in any desired position see Fig. 2 and then moved so that the tooth 17 is placed into contact with a tooth 12 of the disk 11 see Fig. 3. This is possible by reason of the pin 14 being of a lesser diameter than the orifice 13. Now when force is applied to the handle 16 the tooth 17 bearing into a tooth 12 of disk 11 fulcrums therein and causes the pin 14 to take against the periphery of the orifice 13. Then by reason of the tooth 17 engaging with one of the teeth 12 and the pin 14 with the periphery of the orifice 13 a locking action takes place between the handle 16 and the jaw 10. To alter the angle of the parts the handle 16 is operated so that the tooth 17 disengages with the tooth 12 that it had been in engagement with and then inserted into another one.

In Fig. 5 a screw pin 19 with a milled head 20 is used instead of the fixed pin 14 thus enabling a nest of different sized jaws to be operated by one common handle.

Referring to Fig. 6 which shows the spanner constructed in the reverse manner to that shown in Figs. 1 to 4 the handle 16 in this case has the ratchet disk 11 while the jaw 10 has a bifurcated extension 21 with a fixed tooth 17. Either a fixed pin 14 or a screw pin similar to that shown in Fig. 5 may be used.

Referring to Fig. 7 the handle 16 is constructed with a recess 22 and has the pin or lug 14 integral therewith. The pin or lug 14 is of a lesser diameter than the orifice 13 to permit of the ratchet disk 11 being placed in the recess 22 with the tooth 17 in position. The head 23 protrudes beyond the orifice 13 sufficiently far to enable the pin or lug 14 to move in the orifice and make contact with the periphery of the orifice 13 the head 23 preventing the jaw 10 from slipping off when the head takes an eccentric position to the center of the orifice 13. This form of construction enables a nest of different sized jaws to be used without removing the pin 14.

In Fig. 9 is shown the reverse form of construction to Fig. 7 wherein the jaw 10 has an extension 24 having a pin or lug 14 similar to that described in Figs. 7 and 8.

I claim:

1. A spanner comprising two members consisting of head carrying jaws and a handle, one of said members having a ratchet segment provided with an annular orifice in the center thereof and the other having a fixed tooth to engage with the teeth of the ratchet segment, and a fulcrum of smaller diameter than the orifice adapted to take into said orifice, whereby the handle and jaw will have a sliding movement relatively to each other to engage and disengage the fixed tooth with the teeth of the ratchet segment, said fulcrum bearing against the wall of the orifice during the movement of the handle.

2. A spanner comprising two members consisting of head carrying jaws and a handle, one of said members having a ratchet segment provided with an annular orifice in the center thereof and the other having a fixed tooth to engage with the teeth of the ratchet segment, and a fulcrum of smaller diameter than the orifice adapted to take into said orifice, whereby the handle and jaw will have a sliding movement relatively to each other to engage and disengage the fixed tooth with the teeth of the ratchet segment, said fulcrum bearing against the wall of the orifice during the movement of the handle and having an enlarged head overlapping the adjacent surface of the ratchet segment.

LYLE OSWALD CAPEL.

Witnesses:
T. C. ALLEN,
AMY GAUDER.

Copies of this patent may be obtained for five cents each, by addressing the "Commissioner of Patents, Washington, D. C."